US009154285B2

(12) United States Patent
Deb et al.

(10) Patent No.: US 9,154,285 B2
(45) Date of Patent: Oct. 6, 2015

(54) COMMUNICATIONS APPARATUS, SYSTEM AND METHOD WITH ERROR MITIGATION

(71) Applicant: NXP B.V., Eindhoven (NL)

(72) Inventors: Abhijit Kumar Deb, Eindhoven (NL); Hubertus Gerardus Hendrikus Vermeulen, Eindhoven (NL); Sujan Pandey, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/341,420

(22) Filed: Jul. 25, 2014

(65) Prior Publication Data
US 2014/0334291 A1 Nov. 13, 2014

Related U.S. Application Data

(63) Continuation of application No. 13/535,335, filed on Jun. 27, 2012, now Pat. No. 8,817,810.

(51) Int. Cl.
*H04L 1/00* (2006.01)
*H04L 5/00* (2006.01)
*H04L 12/939* (2013.01)

(52) U.S. Cl.
CPC ............. *H04L 5/006* (2013.01); *H04L 1/0061* (2013.01); *H04L 5/0085* (2013.01); *H04L 49/557* (2013.01)

(58) Field of Classification Search
None
See application file for complete search history.

(56) References Cited

U.S. PATENT DOCUMENTS

| 5,101,339 | A | 3/1992 | Fairman et al. |
| 5,857,080 | A | 1/1999 | Jander et al. |
| 5,940,440 | A | 8/1999 | Werner et al. |
| 6,456,633 | B1 | 9/2002 | Chen |
| 6,633,606 | B1 | 10/2003 | Oh |
| 7,170,931 | B2 | 1/2007 | Greiss et al. |
| 2002/0027953 | A1 | 3/2002 | Hwang et al. |
| 2004/0022222 | A1 | 2/2004 | Clisham |

FOREIGN PATENT DOCUMENTS

WO 9617304 A1 6/1996

OTHER PUBLICATIONS

FlexRay Communications System Protocol Specification Version 3.0.1, FlexRay Consortium, pp. 1-341 (Oct. 2010).
FlexRay Communications System Protocol Specification Version 2.1 Revision E, Consortium internal release, pp. 1-318 (Jun. 5, 2009).

(Continued)

*Primary Examiner* — Alex Skripnikov

(57) ABSTRACT

Data communications are effected over one or more network branches to ensure appropriate receipt of data at different devices on the network. In accordance with an example embodiment, time-based communications are effected for a plurality of different network devices, at least two of which are connected to a common wired network link, with each network device being assigned to communicate during different time slots within a communication cycle. Each communication received on the common wired network link is assessed as being error-indicative or not error-indicative. In response to a received communication on the common wired network link being assessed as being error-indicative, the common wired network link is operated to corrupt data received on the branch, such as by driving the branch during a time slot in which the error-indicative communication is received, therein ensuring that other network devices disregard the data received during that time slot.

8 Claims, 3 Drawing Sheets

(56) References Cited

OTHER PUBLICATIONS

FlexRay Communications System Preliminary Central Bus Guardian Specification Version 2.0.9, pp. 1-38 (Dec. 15, 2005).

Godard, "Self-Recovering Equalization and Carrier Tracking in Two-Dimensional Data Communication Systems", IEEE Transactions on Communications, vol. com-28, No. 11, pp. 1867-1875 (Nov. 1980).

Sato, Y. "A Method of Self-Recovering Equalization for Multilevel Amplitude-Modulation Systems", IEEE Transactions on Communications, vol. 23, No. 6, pp. 679-682 (Jun. 1975).

COMMUNICATIONS APPARATUS, SYSTEM AND METHOD WITH ERROR MITIGATION

CROSS-REFERENCE TO RELATED APPLICATION

This application is a continuation of copending U.S. patent application Ser. No. 13/535,335, filed on Jun. 27, 2012, the contents of which are incorporated by reference herein Aspects of various embodiments of the present invention are directed to network communications, such as time-based communications.

In various communications networks, different nodes of a distributed system exchange data through a centralized component. If one of the nodes develops an error, that error may be communicated over the network. Spreading such an error is generally undesirable, particularly on networks such as automotive networks in which safety type components communicate.

One type of communication approach that has been used in certain applications includes time-based communications, in which a data stream is segmented into frames for sharing a communication medium. Such data communication is susceptible to a variety of errors. For example, a node on the network may develop an error and communicate erroneous data, may communicate during an incorrect time slot, or communications between nodes may be corrupted (e.g., via electro-magnetic interference (EMI)). When errors are detected on a particular branch, further dissemination of the errors can be prevented. However, if one or more nodes on the branch receive the data before an error therein has been generated (e.g., before data is corrupted), those one or more nodes may accept the data. As a result, these nodes have more up-to-date data compared to other nodes in the system that do not receive or reject the data as erroneous. This creates an inconsistency in the freshness of data available to different nodes. However, for a safety critical system, it is desirable that all nodes have the same information and make their decisions based on the same data.

These and other matters have presented challenges to data communications for a variety of applications.

Various example embodiments are directed to communication circuits, their implementation, and methods for communication.

According to a particular example embodiment, an apparatus includes a wired network including a plurality of network branches each having a common communication link, a plurality of network devices connected to the network branches, a plurality of time-slot communication schedules, respectively stored and accessible by each of the network devices, and a central communication circuit (e.g., a central gateway circuit). The plurality of time-slot communication schedules designate time slots during which each network device is assigned to communicate over one of the plurality of network branches. The central communication circuit includes a central-communication schedule stored and accessible by the central communication circuit, data-coupling circuitry configured and arranged for communicatively coupling data between the central communication circuit and each of the plurality of network devices through respective ones of the plurality of network branches, and data-logic circuitry. The data-logic circuitry receives communications from the plurality of network devices using time slots assigned for each network device in the central-communication schedule, and assesses each received communication from one of the network devices on the branch as being error-indicative or not error-indicative. In response to a received communication on one of the network branches being assessed as being error-indicative, the data-logic circuitry facilitates data corruption on the one of the network branches during a time period corresponding to the received communication. Such data corruption may involve, for example, corrupting a data frame on the one of the network branches, by driving against the one of the network branches.

Another example embodiment is directed to an apparatus having data-logic circuitry and a driver circuit that drives a wired network link for time-based communications with a plurality of different network devices. At least two of the network devices are connected to the wired network link, with each network device being assigned to communicate during different time slots within a communication cycle. The data-logic circuitry assesses communications received on the wired network link as being error-indicative or not error-indicative, using time slots assigned for the at least two network devices in a communication schedule. The driver circuit is operated to drive the wired network link (from which the erroneous data frame is received) during a time slot in which communications assessed as being error-indicative are received. In some implementations, the apparatus operates as a central node that forwards received communications assessed as being not error-indicative, to at least another one of the plurality of network devices.

Other embodiments are directed to methods for communicating using time-based communications, with a plurality of different network devices in which at least two are connected to a common wired network link, in which each network device is assigned to communicate during different time slots within a communication cycle. For communications received on the common wired network link using time slots assigned for the at least two network devices in a communication schedule, each received communication is assessed as being error-indicative or not error-indicative. In response to received communications assessed as being error-indicative, the common wired network link is driven during a time slot in which the error-indicative communication is received. In some implementations, communications are forwarded to at least another one of the plurality of network devices, in response to the communications being assessed as being not error-indicative.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
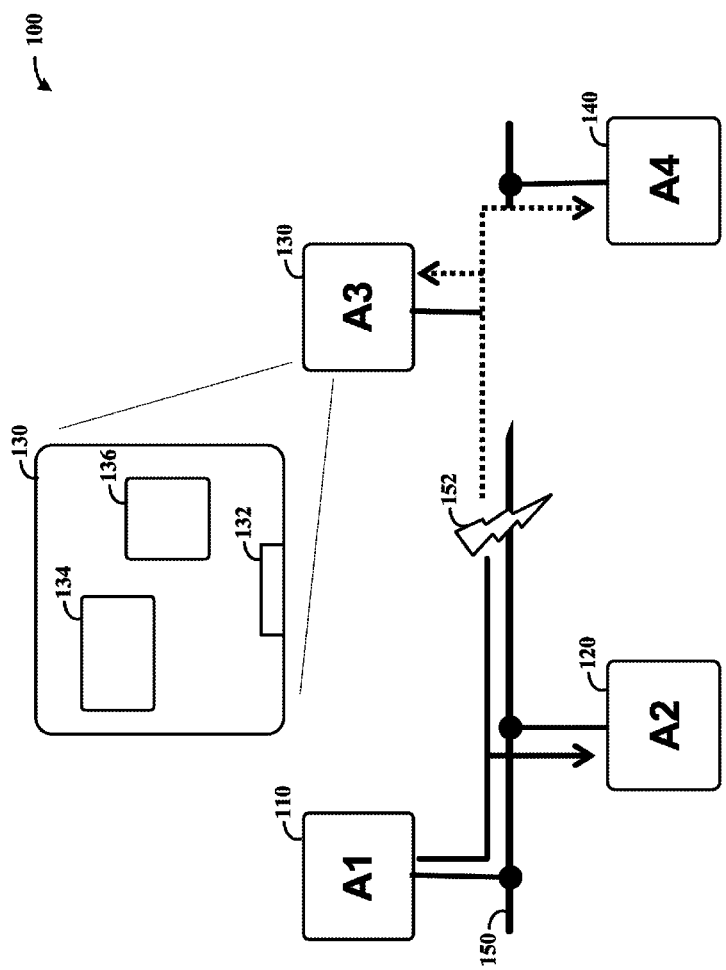
FIG. 1 shows an apparatus with one or more devices/nodes therein that operate to mitigate error-indicative communications, in accordance with an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention, including aspects defined in the claims. In addition, the term "example" as used throughout this application is only by way of illustration, and not limitation.

Aspects of the present invention are believed to be applicable to a variety of different types of devices, systems and arrangements involving time-based data communications between different network branches, with some or all of the branches having two or more components communicating thereupon. While the present invention is not necessarily so limited, various aspects of the invention may be appreciated through a discussion of examples using this context.

Various example embodiments are directed to network communication apparatuses, systems and methods in which communications are assessed for errors at one or more network nodes, and in which further communications are effected to ensure that a communication bearing an error at one of the network nodes is not accepted at another network node. This approach may involve, for example, driving a network branch upon which an error-indicative communication is received during a time slot in which the communication is received, to ensure that other devices on the branch do not process the communication.

Such approaches are, for instance, amenable for implementation to ensure that communications that are received at a first node in an acceptable (e.g., error-free) condition yet are corrupted during transmission before receipt at a second node are not accepted at any of the nodes. This can be useful, for example, to ensure that nodes are not updated with new data unless all nodes receive the data in an acceptable/error-free type of condition.

A more particular example embodiment is directed to an apparatus including a central network component that assesses communications received along various network branches from devices connected to the branches. When a communication is assessed to be error-indicative, the central network component does not forward the communication to other branches and also drives the originating branch from which the communication is received to ensure that other network devices on the branch do not accept/process the communication. This approach can be carried out, for example, to ensure that those devices on the originating branch that may receive the communication in an error-free condition do not update, accept and/or process the communication. With respect to automotive applications, this approach can ensure that safety-related communications, such as those involved in communication from a braking system, are distributed consistently to different network components.

In another more particular embodiment, an apparatus includes a wired network including network branches and network devices of which each device is connected to a common communication link of one of the network branches, and communicates using a time-slot communication schedule that designates time slots during which the network device is assigned to communicate. A central communication circuit includes data-coupling circuitry that communicates data between each of the plurality of network devices through respective ones of the plurality of network branches and via the central communication circuit, in accordance with an assigned communication/data-forwarding schedule. Data-logic circuitry receives communications from each network device using a time slot assigned for the network device. Received communications assessed to be error-free or otherwise not error-indicative are forwarded. Communications assessed as being error-indicative are not forwarded and, further, the network branch from which such communications are received is driven during the time slot in which the data is received to ensure that other network devices on the branch do not use or accept/process the data.

Various embodiments are directed to time-based communications involving a time division multiple access (TDMA) technique, in which a data forwarding schedule is provided to a central component that uses the schedule to forward frames between one or more network branches coupled to the central component. Frames that do not comply with certain protocols can be confined to an originating branch, and that originating branch is further driven (e.g., as discussed above) to ensure that devices on the originating branch do not process the communications.

In certain embodiments, suppression of error-based communications as discussed herein is carried out using in-vehicle networks (IVNs), such as for automobiles, trains, airplanes and other vehicles. For instance, various embodiments are directed to implementations involving automotive protocols such as the FlexRay protocol, in which the time frames during which data is communicated are monitored for errors and network branches are further driven during such time frames deemed as having error-indicative data communicated therein. This error-suppressive driving can also be carried out independent from any knowledge of which node is communicating on each time frame.

In some implementations, one or more embodiments as discussed herein are implemented with FlexRay protocol applications specifically targeting the communication needs of the safety critical in-vehicle networks that use TDMA to exchange data during static segments, via a central component (e.g., a Central Bus Guardian) that monitors incoming frames against different rules. Such rules may include, for example, identifying as erroneous: 1) a data frame that appears from a branch during a time slot when the branch is not supposed to transmit; 2) a data frame that appears from a branch too late within its scheduled time slot such that the frame may cause a slot boundary violation; and 3) a data frame that appears from a branch with incorrect header information or checksum. The central component operates to drive branches from which incoming frames are received during the time slot in which the frames are received when the data therein is determined to be erroneous (e.g., corrupted).

For general information regarding communications protocols, and for specific information regarding communication protocols that may be implemented in connection with one or more example embodiments, reference may be made to the "FlexRay Communications System Protocol Specification," ver 3.0, and to the "FlexRay Communications System Preliminary Central Bus Guardian Specification," ver 2.0.9, both available from the FlexRay consortium and fully incorporated herein by reference.

The various example embodiments as discussed herein are implemented with different systems, on different platforms, and with different environments (e.g., automotive, manufacturing and others) to suit a variety of applications. One such application involves a branch-type active star device TJA1085 available from NXP Semiconductors of Eindhoven, The Netherlands. Accordingly, various embodiments are directed to implementation with such a device in an automotive network.

Turning now to the figures, FIG. 1 shows an apparatus 100 with one or more devices/nodes therein that operate to mitigate error-indicative communications, in accordance with another example embodiment of the present invention. The apparatus 100 includes network devices 110, 120, 130 and 140 that respectively communicate on a common network link 150 (e.g., and related data-coupling circuitry connecting each respective device thereto). Some or all of the network devices include, as shown by way of example with network device 130, data-coupling circuitry 132 (e.g., a network interface circuit), data-logic circuitry 134 and a driver 136 for driving the common network link 150.

Using network device 130 as an example, when communications are received over the common network link 150 via interface 132, the data-logic circuitry 134 assesses the data to determine whether or not the data is error-indicative. If the data is determined to be error-indicative, the data-logic circuitry 134 operates the drive circuit 136 to drive the common network link 150 during the time frame in which the data is received, which causes other network devices on the link to ignore or otherwise not use data received during the time frame.

For example, when the network device 110 sends data that reaches network device 120 correctly, that data may be corrupted before reaching network device 130, as represented at 152 (e.g., as interference in the link between network devices 120 and 130). Accordingly, the data-logic circuit 134 detects the data as being error-indicative, with network device 130 operating in a supervisory type of mode. Based upon the detection, the data-logic circuit 134 operates the driver 136 to drive the common network link 150. As a result, the network device 120 also finds the received data as erroneous, ensuring consistency of freshness in data communicated on the network communication link 150 (e.g., all nodes can base decisions on the same information). For instance, by driving the common network link 150 to an undefined state during the time slot in which the data detected as being error-indicative is received, the network devices on the common wired link assess the time slot as being error-indicative and disregard the received data.

As may be implemented as or with the apparatus 100 (or otherwise), another example embodiment is directed to an apparatus having a driver circuit and data-logic circuitry, for use with time-based communications from a plurality of different network devices in which at least two of the network devices are connected to a common wired network link. Each network device is assigned to communicate during different time slots within a communication cycle. The driver circuit configured drives the wired network link at the direction of the data-logic circuitry. In particular, the data-logic circuitry assesses each received communication received on the common wired network link, using the assigned time slots, as being error-indicative or not error-indicative. Communications assessed as being not error-indicative are forwarded to at least another one of the plurality of network devices. For communications assessed as being error-indicative, the driver circuit is operated to drive the common wired network link during a time slot in which the error-indicative communication is received.

In some implementations, first, second and third such network devices are connected to a common wired link with the second network device being connected between the first and third network device. The third network device includes the driver circuit and data-logic circuitry, and operates to drive against the network link, in response to a communication received from the first network device and delivered error-free to the second network device but assessed as being error-indicative at the third network device. This driving causes the second network device to disregard the error-free communication received at the second network device.

In other implementations, the driver circuit and data-logic circuitry are in a central communication circuit that operates to forward received data according to a central communication schedule data, to pass data between the network devices for that data assessed as being not error-indicative. For data assessed as being error-indicative, the central communication circuit does not forward the data and also drives against the network branch from which the data is received, which ensures that other devices on the branch disregard the error-indicative data.

In various implementations, the network devices (e.g., 130) stores a time-slot communication schedule specific to the device. This schedule may, for example, be communicated from a central communication type circuit such as the circuit 210 as shown in FIG. 2.

Figure 2:
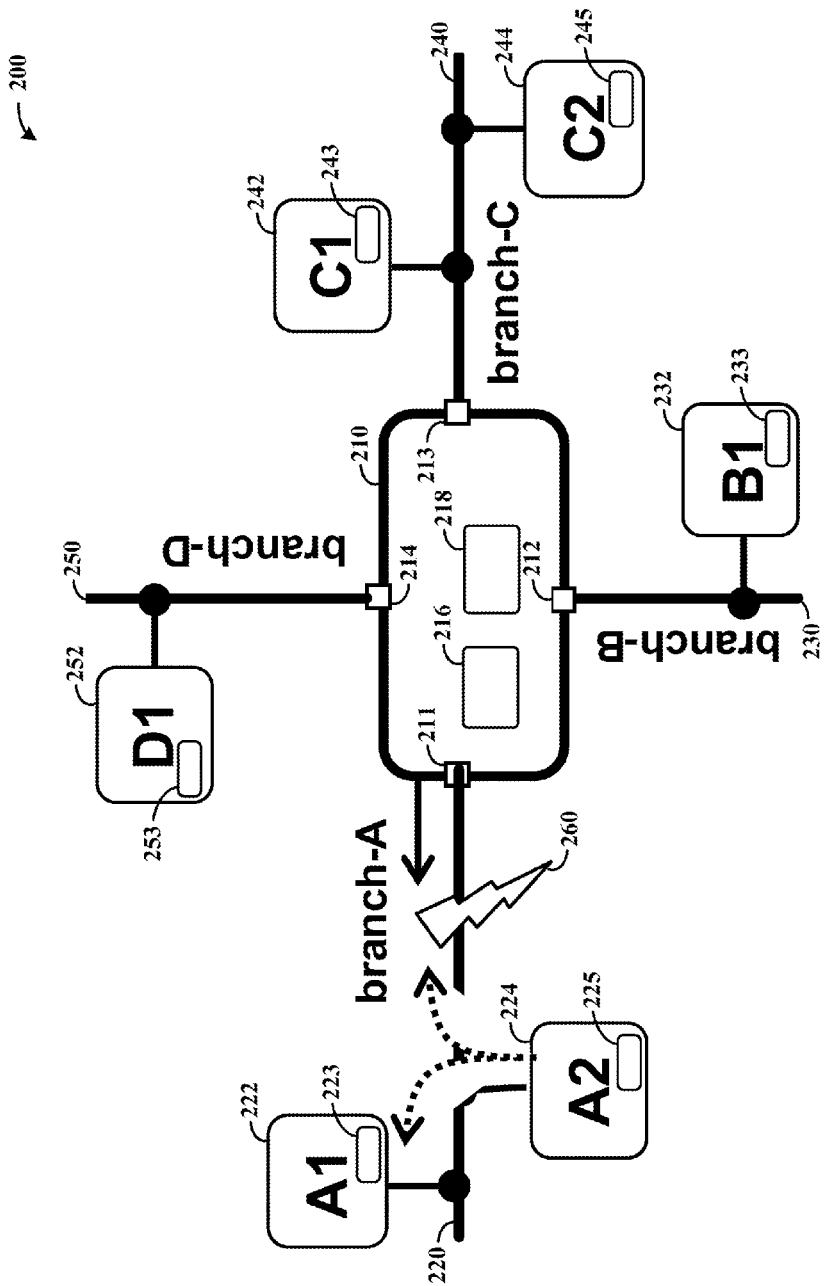
FIG. 2 shows another apparatus with a central component coupled to various network devices on respective network branches, in accordance with another example embodiment of the present invention.

FIG. 2 shows another communication apparatus 200 with a central component coupled to various network devices on respective network branches, in accordance with another example embodiment of the present invention. The apparatus 200 includes a central communication circuit 210, and is shown by way of example as having four branches 220, 230, 240 and 250 (e.g., wire-based pathways), with each branch including one or more network communication devices. By way of example, branches 220 and 240 are shown each having two network devices, with branch 220 having devices 222 and 224, and branch 240 having devices 242 and 244. Branches 230 and 250 are shown each respectively having single network devices 232 and 252. Each network device includes a data storage component that stores time-slot communication schedule data respectively at 223, 225, 233, 243, 245 and 253. The central communication circuit 210 includes data-coupling circuitry including input/output interface circuits (or ports) 211, 212, 213 and 214 (and, e.g., interconnects within the circuit 210), and a data-logic circuit 216 that forwards data according to both a communication schedule and a driver circuit 218. In some implementations, the central communication circuit 210 includes an additional input port designated for receiving configuration data (e.g., from an external source), such as for setting a communication schedule and/or protocol for communicating with the respective network devices.

The data-logic circuit 216 assesses data received from the respective network branches as being error-indicative or not error-indicative, as may be determined as discussed otherwise herein. The central communication circuit 210 forwards data not indicated as being error-indicative to other branches, according to a communication schedule. For data being error-indicative, the central communication circuit 210 selectively does not forward (e.g., blocks) dissemination of the data to other branches, and further drives the branch on which the data has been received during the time slot in which the data was received, therein ensuring other devices on the branch do not use data received during that time slot.

Referring to network branch 220 by way of example, when network device 224 communicates on the branch, the communication can be received by both the network device 222 and the central communication circuit 210. When time slots during which network device 224 communicates are detected as error indicative at the central communication circuit 210, the data-logic circuit 216 controls the driver circuit 218 to drive the network branch 220 during a time slot detected as having an error. This driving may, for example, drive the network branch 220 to an undefined state. This causes the network device 222 to disregard the communication (e.g., by causing the device to conclude that a checksum or cyclic redundancy check error has occurred during the time slot). This approach can be useful, for example, when a communication from network device 224 is received in an error-free condition at network device 222, but is corrupted at 260 (shown by way of example) before reaching the central communication circuit 210. This can prevent network device 222 from updating with the received data which is not received by other devices (e.g., to which the centrally communication circuit 210 would have otherwise forwarded the communication) in view of the error.

In this context, the network devices automatically determine that the data received during the time slot should be discarded/disregarded as being in error with respect to receipt of the data on at least another one of the time slots. In some instances, one or more network devices on the branch being driven is responsive to the driving by automatically determining that the data received during the time slot is in error using an error-detecting code and a check value communicated with the received communication (e.g., the driving renders a cyclic redundancy check (CRC) or checksum value to indicate an error). Disregarding received data may include, for example, not storing or using the received data as a processing input (e.g., as may relate to an automatic braking system input), as an update and/or as a configuration input.

In some embodiments, the network devices 222 and 224 store time slot data at 223 and 225 that assign the respective devices to communicate during different time slots on the network branch 220. Each device 222 and 224 also includes a microcontroller that accesses the stored time slot data and an input/output port through which the microcontroller communicates with the branch 220 (e.g., a common wired-based pathway) in accordance with the time slot data. The microcontrollers evaluate received data and, when the network branch 220 is driven by the central communication circuit 210, evaluates received data to be in error.

Figure 3:
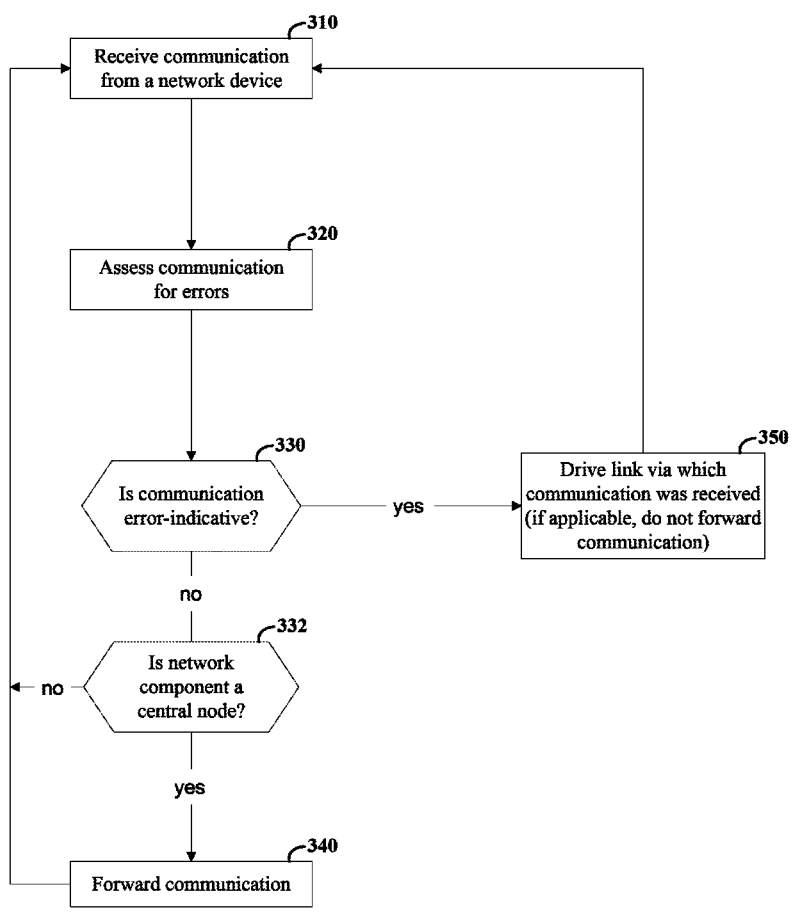
FIG. 3 is a flow diagram for mitigating error-indicative communications, in accordance with another example embodiment of the present invention.

FIG. 3 is a flow diagram for mitigating error-indicative communications, in accordance with another example embodiment of the present invention. The diagram shown in FIG. 3 is amenable for use with time-based communications from a plurality of different network devices in which two or more of the devices are connected to a common wired network link and each network device is assigned to communicate during different time slots within a communication cycle. This example embodiment is discussed in this context.

At block 310, communications are received at a network component, via a network link to which two or more devices are connected, using time slots assigned for the network devices. At block 320, the received communications are assessed as being error-indicative or not error-indicative. This assessment may involve, for example, assessing for corruption, schedule compliance or other characteristics.

If received communications are not found to be error-indicative at block 330 and the network component operates as a node that selectively forwards data to other nodes (e.g., as in central communication circuit 210 in FIG. 2) at block 332, the received communications are forwarded to one or more additional network devices at block 340, and the process continues at block 310. If the received communications are not found to be error indicative at block 330 and the network components operates as one of many nodes on a branch (e.g., as in component 130 in FIG. 1), the process continues at block 310 (e.g., with no active forwarding at block 340). If received communications are found to be error-indicative at block 330, the common wired network link is driven during the time slot in which the error-indicative communication is received at block 350, the received communications are not forwarded (e.g., if the network component selectively forwards data, such as with central communication circuit 210), and the process continues at block 310. These approaches are applicable, for example, to a central node receiving data from and forwarding data to network branches, and to nodes on a particular branch that monitor the branch for erroneous data and drive against the branch when such erroneous data is detected.

Accordingly, in some implementations, the approach shown in FIG. 3 is carried out in part at a central communication node connected to respective network branches, in which error-indicative communications are not forwarded to other branches and in which branches from which the error-indicative communications are received are driven to ensure other network devices on the branch do not use/accept/process/update with the data. In other implementations, the approach shown in FIG. 3 is carried out at a network device on a network link, by driving the link responsive to detecting error-indicative data in order to ensure that other devices on the link that may have received the data in an error-free state do not use/accept/process/update with the data.

Based upon the above discussion and illustrations, those skilled in the art will readily recognize that various modifications and changes may be made to the present invention without strictly following the exemplary embodiments and applications illustrated and described herein. For example, various types of error detection may be implemented in accordance with embodiments as discussed herein, with time-slot based mitigation of both the dissemination of communications designated as being error-indicative, and the use of such communications as may have been received in an error-free state (e.g., prior to corruption). In addition, one or more components of the various apparatuses and systems described herein may be implemented separately or together, in accordance with one or more example embodiments. Such modifications do not depart from the true spirit and scope of the present invention, including that set forth in the following claims.

What is claimed is:

1. For use with time-based communications from a plurality of different network devices, at least three of the network devices connected to a common wired network link, in which each network device is assigned to communicate during different time slots within a communication cycle, an apparatus comprising:

a driver circuit configured and arranged to drive the wired network link;

data-logic circuitry configured and arranged to for communications received on the common wired network link using time slots assigned for the at least three network devices in a communication schedule, assess each received communication as being error-indicative or not error-indicative based on the communication schedule, and in response to the each received communication on the common wired network link being assessed as being error-indicative, operating the driver circuit to drive the common wired network link during a time slot in which the error-indicative communication is received;

wherein the at least three of the network devices includes first, second and third network devices, the second network device being connected between the first and third network device on the common wired network link; and the third network device includes the driver circuit and data-logic circuitry and is configured and arranged to forward, to at least another one of the plurality of network devices, received communications assessed as being not error-indicative; and for the each communication received from the first network device and delivered error-free to the second network device and assessed as being error-indicative at the third network device, operate the driver circuit to drive the common wired network link and cause the second network device to disregard the error-free communication received at the second network device.

2. The apparatus of claim 1, wherein
the apparatus is a network device in the plurality of different network devices connected to a single branch formed by the common wired network link and to which at least three other network devices in the plurality of different network devices are connected to communicate on the branch, and
the data-logic circuitry operates the driver circuit to drive the common wired network link by driving the link to corrupt data sent by one of the at least three other network devices and received by another one of the at least three network devices.

3. The apparatus of claim 1, further including a central communication circuit that includes the driver circuit and the data-logic circuitry, the central communication circuit being configured and arranged with central communication schedule data to forward received communications assessed as being not error-indicative to another one of the plurality of network devices in the plurality of different network coupled to the central communication circuit via a different wired link and according to a time slot defined in the central communication schedule data for communications to the other one of the plurality of network devices.

4. The apparatus of claim 1, wherein the apparatus includes the plurality of network devices, and each of the network devices are configured and arranged to communicate according to a time-slot communication schedule specific to the respective network device and respectively stored and accessible by each of the network devices.

5. The apparatus of claim 1, further including data-coupling circuitry configured and arranged for communicatively coupling data between the data-logic circuitry and the plurality of network devices, each network device coupled to one of a plurality of network branches, one of the network branches including the common wired network link, the data-coupling circuitry being connected between each of the network branches with communications between the branches passing via the data-coupling circuitry.

6. For use with time-based communications from a plurality of different network devices, at least three of the network devices connected to a common wired network link in which each network device is assigned to communicate during different time slots within a communication cycle, a method performed by an apparatus comprising:
for communications received on the common wired network link using time slots assigned for the at least three network devices in a communication schedule, assessing each received communication as being error-indicative or not error-indicative based on the communication schedule; and
in response to a received communication on the common wired network link being assessed as being error-indicative, driving the common wired network link during a time slot in which the error-indicative communication is received;
wherein the at least three of the network devices includes first, second and third network devices, the second network device being connected between the first and third network device on the common wired network link,
further including, at the third network device, forwarding received communications assessed as being not error-indicative to at least another one of the plurality of network devices, and
wherein the steps of assessing and driving are carried out at the third network device and further include, for a communication received from the first network device and delivered error-free to the second network device and assessed as being error-indicative at the third network device, driving the common wired network link with data that causes the second network device to disregard the error-free communication received at the second network device.

7. The method of claim 6, wherein the apparatus is a network device connected to a single branch formed by the common wired network link and to which at least three other network devices are connected to communicate on the branch, and driving the common wired network link includes driving the link to corrupt data sent by one of the at least three other network devices and received by another one of the at least three network devices.

8. The apparatus of claim 6, further including forwarding received communications assessed as being not error-indicative includes to another one of the plurality of network devices, coupled via a different wired link and according to a time slot defined in by central communication schedule data for communications to the other one of the plurality of network devices.

* * * * *